United States Patent
Fukuoka et al.

(10) Patent No.: US 10,461,304 B2
(45) Date of Patent: Oct. 29, 2019

(54) CYLINDRICAL BATTERY

(71) Applicant: SANYO Electric Co., Ltd., Daito-shi, Osaka (JP)

(72) Inventors: Takahiro Fukuoka, Tokushima (JP); Shuichi Yamashita, Tokushima (JP); Yuma Yamaguchi, Tokushima (JP); Kyosuke Miyata, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 130 days.

(21) Appl. No.: 15/531,648

(22) PCT Filed: Nov. 27, 2015

(86) PCT No.: PCT/JP2015/005887
§ 371 (c)(1),
(2) Date: May 30, 2017

(87) PCT Pub. No.: WO2016/098291
PCT Pub. Date: Jun. 23, 2016

(65) Prior Publication Data
US 2017/0346064 A1    Nov. 30, 2017

(30) Foreign Application Priority Data
Dec. 16, 2014  (JP) ................... 2014-254578

(51) Int. Cl.
*H01M 2/26* (2006.01)
*H01M 2/02* (2006.01)
(Continued)

(52) U.S. Cl.
CPC ........... *H01M 2/263* (2013.01); *H01M 2/028* (2013.01); *H01M 2/0413* (2013.01); *H01M 2/22* (2013.01);
(Continued)

(58) Field of Classification Search
CPC ............ H01M 2/02; H01M 2/12; H01M 2/26; H01M 10/04
See application file for complete search history.

(56) References Cited

U.S. PATENT DOCUMENTS

2007/0117011 A1    5/2007  Myerberg et al.
2008/0213658 A1*   9/2008  Meguro ................ H01M 4/38
                                                429/178
(Continued)

FOREIGN PATENT DOCUMENTS

CN    101305481 A    11/2008
JP    S54-149839 A1  11/1979
(Continued)

OTHER PUBLICATIONS

International Search Report dated Feb. 9, 2016, issued in counterpart International Application No. PCT/JP2015/005887 (2 pages).
(Continued)

*Primary Examiner* — Kenneth J Douyette
(74) *Attorney, Agent, or Firm* — Westerman, Hattori, Daniels & Adrian, LLP

(57) ABSTRACT

A cylindrical battery including an electrode body in which a negative electrode plate and a positive electrode plate to which a plurality of positive electrode leads is connected are wound with a separator interposed therebetween; an upper insulating plate disposed on the electrode body; a positive electrode current collector plate disposed on the upper insulating plate; a sealing body; and an outer can. A first positive electrode lead extends between the upper insulating plate and the current collector plate after passing through a through-hole of the upper insulating plate and is bent onto the current collector plate at an outer circumference portion thereof, and a second positive electrode lead extends along the outside of an outer circumference portion of the upper insulating plate and is bent onto the current collector plate at the outer circumference portion thereof. Those positive electrode leads are all connected to the current collector plate.

6 Claims, 3 Drawing Sheets

(51) Int. Cl.
*H01M 2/22* (2006.01)
*H01M 2/04* (2006.01)
*H01M 10/04* (2006.01)

(52) U.S. Cl.
CPC ... *H01M 10/0422* (2013.01); *H01M 10/0431* (2013.01); *H01M 2/046* (2013.01)

(56) References Cited

U.S. PATENT DOCUMENTS

| | | |
|---|---|---|
| 2009/0004559 A1 | 1/2009 | Gardner et al. |
| 2012/0009450 A1 | 1/2012 | Chun |
| 2012/0171534 A1* | 7/2012 | Sugimoto ........... H01M 2/1252 429/82 |
| 2013/0316207 A1 | 11/2013 | Suwa |
| 2014/0065470 A1* | 3/2014 | Tsutsumi .......... H01M 10/0422 429/164 |

FOREIGN PATENT DOCUMENTS

| | | |
|---|---|---|
| JP | S57-1402 Y2 | 1/1982 |
| JP | 11-312509 A | 11/1999 |
| JP | 2007-335232 A | 12/2007 |
| JP | 2010-534916 A | 11/2010 |
| JP | 2012-23011 A | 2/2012 |
| WO | 2012/105362 A1 | 8/2012 |
| WO | 2013/038677 A1 | 3/2013 |

OTHER PUBLICATIONS

English Translation of CN Search Report dated Aug. 21, 2019 issued in counterpart CN application No. 201580068729.5.

* cited by examiner

CYLINDRICAL BATTERY

TECHNICAL FIELD

The present invention relates to a cylindrical battery having a positive electrode plate to which a plurality of positive electrode leads is connected.

BACKGROUND ART

In recent years, non-aqueous electrolyte secondary batteries having a high energy density have been widely used as drive power sources for high output applications, such as an electric power tool, an electric assist bicycle, and a hybrid electric automobile. The non-aqueous electrolyte secondary battery is roughly classified based on its outer shape or outer package, into a cylindrical battery, a square battery, and a pouch type battery. Since having a strong resistance against impact from the outside and being easily assembled into a battery pack using many batteries, the cylindrical battery is preferably used for the above application.

The cylindrical battery is formed in such a way that after an electrode body formed by winding a negative electrode plate and a positive electrode plate with at least one separator interposed therebetween is inserted into an outer can, an open portion thereof is sealed by a sealing body. In a general cylindrical battery, since the sealing body functions as a positive electrode external terminal, the positive electrode plate and the sealing body are required to be electrically connected to each other. Hence, as a method for this purpose, a method in which a lead connected to the positive electrode plate is connected to the sealing body has been mainly used in the non-aqueous electrolyte secondary battery.

However, according to the method described above, a current collector portion of the positive electrode plate is limited to a connection portion of the positive electrode lead. Hence, even if the length of the positive electrode plate is increased, sufficient output characteristics may not be obtained in some cases. Accordingly, a plurality of leads is connected to the positive electrode plate so as to optimize the current collector structure of the non-aqueous electrolyte secondary battery. As related art documents on a battery having a positive electrode plate to which a plurality of leads is connected, Patent Documents 1 to 3 may be mentioned.

Patent Document 1 has disclosed a secondary battery in which leads extending from an electrode body are overlapped with each other at one point, and this overlapped portion is connected to a sealing body.

Patent Document 2 has disclosed an electrode winding type battery in which a plurality of leads extending from an electrode body is electrically connected to a conductive member disposed on the electrode body. The conductive member is formed of a nut and a bolt having a flange portion, and the leads extending from the electrode body are each bent onto the flange portion of the bolt and are fixed between the bolt and the nut.

Patent Document 3 has disclosed a nickel cadmium battery in which a plurality of electrode plate tabs extending from a spiral electrode group is connected to an intermediate plate functioning as a current collector plate. Between the electrode group and the intermediate plate, an insulating plate is disposed, and many arc-shaped openings into which the electrode plate tabs are to be inserted are provided in the intermediate plate and the insulating plate. The electrode plate tabs inserted into the arc-shaped openings are bent on the intermediate plate and are connected thereto.

CITATION LIST

Patent Document

Patent Document 1: Japanese Published Unexamined Patent Application No. 2007-335232
Patent Document 2: Japanese Published Unexamined Patent Application No. 11-312509
Patent Document 3: Japanese Examined Utility Model Registration Application Publication No. 57-1402

SUMMARY OF INVENTION

Technical Problem

Compared to the case in which one lead is connected to the sealing body, as disclosed in Patent Document 1, a plurality of leads is not easily connected to the sealing body. In addition, when the positions of the leads on the electrode body are varied because of the variation in thickness of the electrode plate and the like, it becomes difficult to continuously perform a step of connecting a plurality of leads to the sealing body under the same condition, and the problem of degradation in productivity may arise in some cases.

Since the bolt and the nut, which fix the plurality of leads therebetween, are used as an external terminal in Patent Document 2, a step of connecting the leads to the sealing body may be omitted. However, according to the technique disclosed in Patent Document 2, since the bolt and the nut, which have no contribution to charge and discharge, occupy a large space in the battery, the battery density is decreased. In particular, when the technique disclosed in Patent Document 2 is applied to a compact battery, the problem described above becomes more serious.

In the structure as disclosed in Patent Document 3 in which the plurality of electrode plate tabs is connected onto the intermediate plate, and the intermediate plate and the sealing body are electrically connected with the lead, a plurality of leads is not required to be connected to the sealing body. However, the plurality of leads is required to be inserted into the respective openings of the intermediate plate and the insulating plate, and as a result, the productivity is degraded. In addition, when the openings are provided in the intermediate plate functioning as the current collector plate, the electric resistance of the intermediate plate is unfavorably increased.

Solution to Problem

In order to solve the problems described above, a cylindrical battery according to the present invention comprises: an electrode body in which a negative electrode plate and a positive electrode plate to which a plurality of positive electrode leads is connected are wound with at least one separator interposed therebetween; an upper insulating plate disposed on the electrode body; a current collector plate disposed on the upper insulating plate; a sealing body, and an outer can. The upper insulating plate has at least one through-hole, and the plurality of positive electrode leads includes at least one first positive electrode lead disposed at an inner circumference side of the upper insulating plate and at least one second positive electrode lead disposed at an outer circumference side of the upper insulating plate. The first positive electrode lead extends between the upper insulating plate and the current collector plate after passing through the through-hole of the upper insulating plate and is bent onto the current collector plate at an outer circumference portion thereof, and the second positive electrode lead extends along the outside of the outer circumference portion of the upper insulating plate and is bent onto the current collector plate at the outer circumference portion thereof. The first positive electrode lead and the second positive electrode lead are connected to the current collector plate, and the current collector plate is electrically connected to the sealing body.

Advantageous Effects of Invention

According to the present invention, although having a positive electrode plate to which a plurality of positive electrode leads is connected, a cylindrical battery excellent in productivity can be provided.

BRIEF DESCRIPTION OF DRAWINGS

FIG. 3 FIGS. 3(a) to 3(f) are perspective views sequentially showing steps of a method for connecting positive electrode leads extending from an electrode body to a current collector plate according to the embodiment.

DESCRIPTION OF EMBODIMENT

Hereinafter, an embodiment of the present invention will be described using a cylindrical non-aqueous electrolyte secondary battery 10 shown in FIG. 1. However, the following embodiment will be described by way of example in order to facilitate the understanding of the technical scope of the present invention, and the present invention is not limited to this embodiment.

Figure 1:
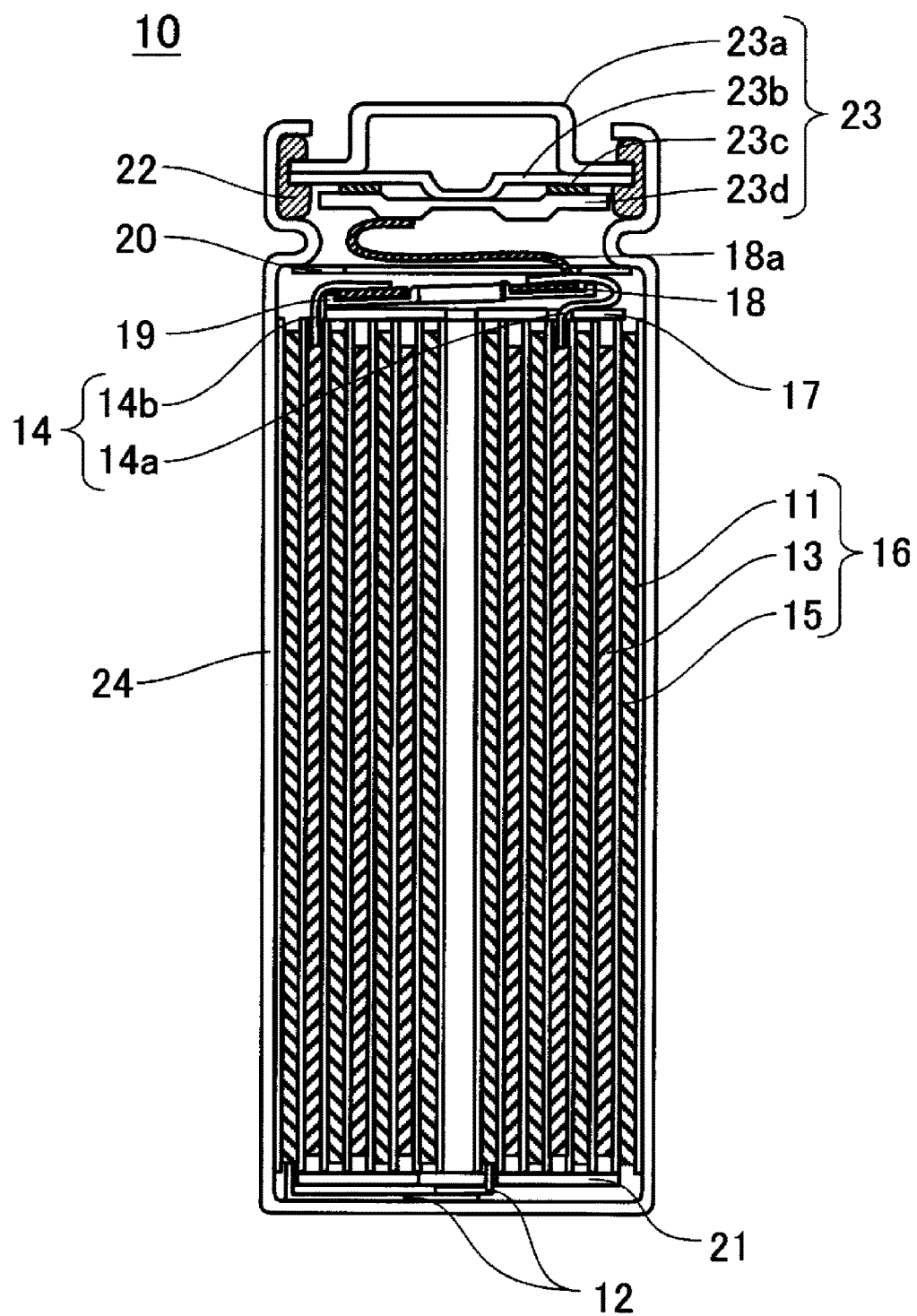
FIG. 1 is a cross-sectional view of a cylindrical non-aqueous electrolyte secondary battery according to an embodiment.

The cylindrical non-aqueous electrolyte secondary battery 10 according to this embodiment includes, as shown in FIG. 1, a cylindrical outer can 24 having a bottom portion, an electrode body 16 inserted in the outer can 24, and a sealing body 23 sealing an open portion of the outer can 24. In the battery, a non-aqueous electrolyte in which an electrolyte salt is dissolved in a non-aqueous solvent is contained.

The sealing body 23 includes an external terminal cap 23a, an explosion-proof valve 23b, and a terminal plate 23d and is fixed to the open portion of the outer can 24 by caulking with a gasket 22 interposed therebetween. The external terminal cap 23a has a flange portion, and this flange portion is electrically connected to the explosion-proof valve 23b. The explosion-proof valve 23b and the terminal plate 23d are connected to each other at the central portions thereof with an annular insulating plate 23c interposed therebetween. The connection portion therebetween is fractured when the pressure inside the battery is increased to a predetermined value, so that a current path in the battery is interrupted. When the pressure inside the battery is further increased, the explosion-proof valve 23b is fractured, so that gases in the battery are released.

Figure 2:
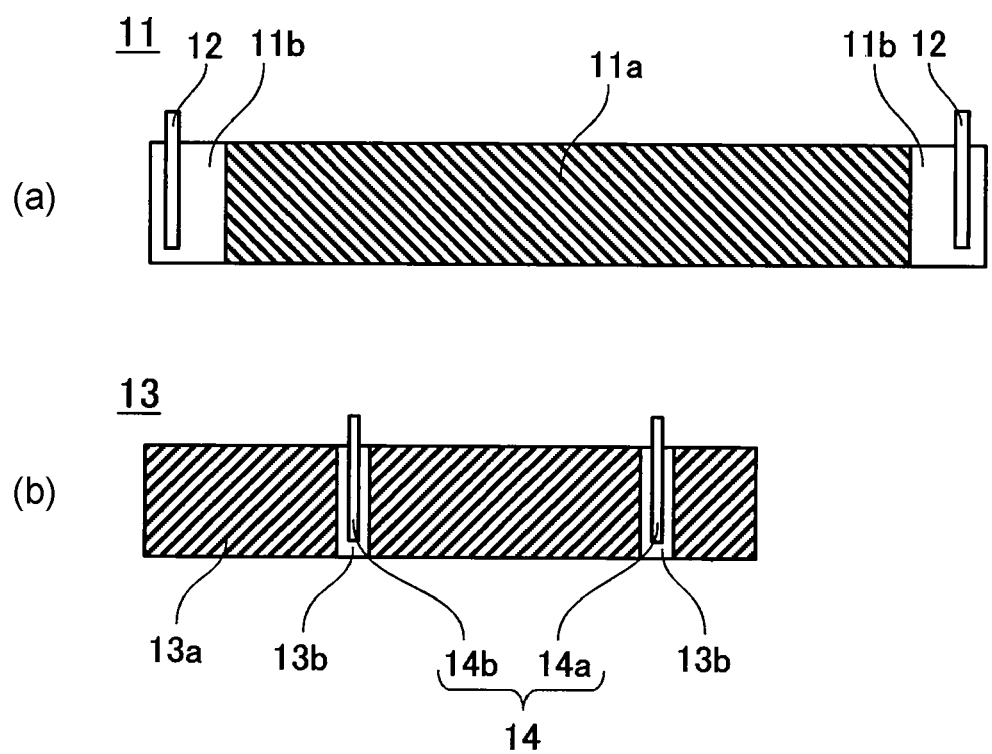
FIG. 2(a) is a plan view of a negative electrode plate according to the embodiment.
FIG. 2(b) is a plan view of a positive electrode plate according to the embodiment.

The electrode body 16 is composed of a negative electrode plate 11, a positive electrode plate 13, and at least one separator 15 and is formed by winding the negative electrode plate 11 and the positive electrode plate 13 with the separator 15 interposed therebetween. As shown in FIG. 2, to the negative electrode plate 11 and the positive electrode plate 13, two negative electrode leads 12 and two positive electrode leads 14 are connected, respectively. In the battery, the negative electrode leads 21 are bent so as to be parallel to a bottom surface of the outer can 24. Of the two negative electrode leads 12, a negative electrode lead at an outer circumference side of the electrode body 16 is connected to the bottom portion of the outer can 24, and onto this connection portion, a negative electrode lead at an inner circumference side of the electrode body 16 is connected. The two positive electrode leads 14 are connected to a current collector plate 18, and the current collector plate 18 is electrically connected to the terminal plate 23d of the sealing body 23 with a current collector lead portion 18a interposed therebetween. At an upper portion and a lower portion of the electrode body 16, an upper insulating plate 17 and a lower insulating plate 21 are disposed, respectively. On the current collector plate 18, a ring-shaped insulating plate 20 is further disposed.

Figure 3:
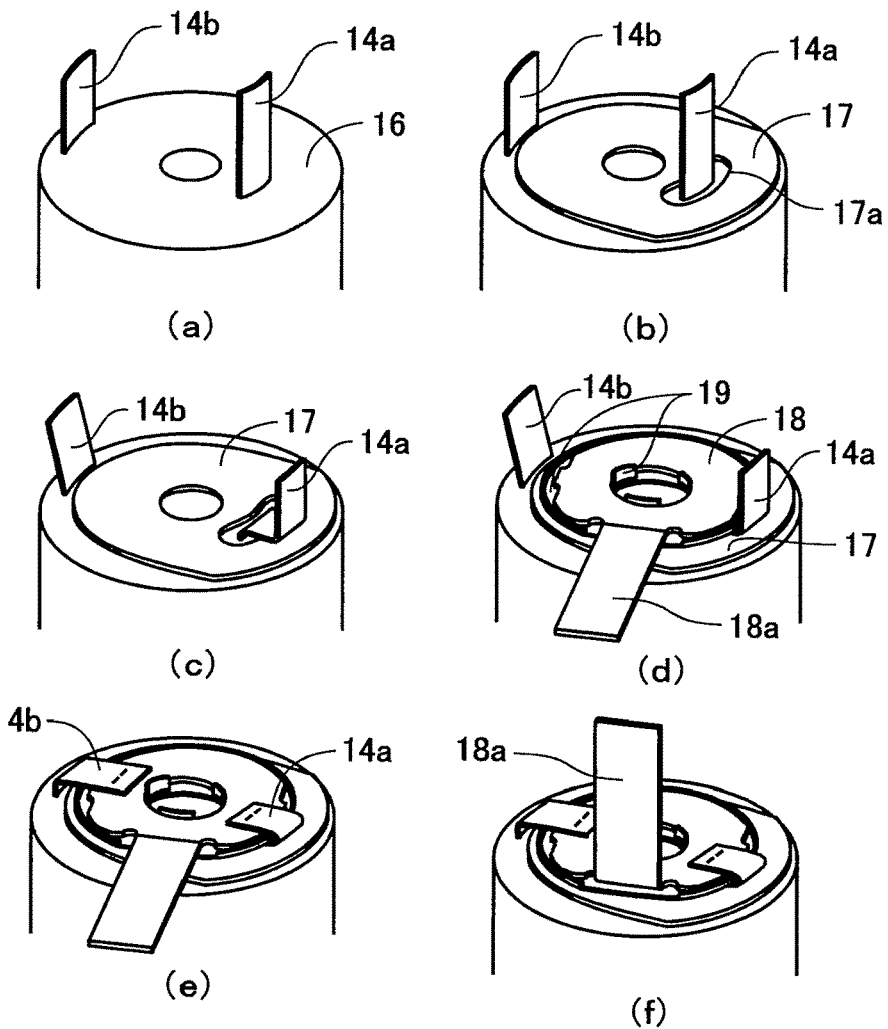

A connection method of the positive electrode leads 14 to the current collector plate 18 will be described in detail with reference to FIG. 3. From the electrode body 16 right after the formation thereof, a first positive electrode lead 14a and a second positive electrode lead 14b extend (FIG. 3(a)). First, the first positive electrode lead 14a is inserted in a through-hole 17a, so that the upper insulating plate 17 is disposed on the electrode body 16 (FIG. 3(b)). Next, the first positive electrode lead 14a and the second positive electrode lead 14b are bent to the outside of the electrode body 16 (FIG. 3(c)), and the current collector plate 18 provided with an insulating member 19 at a lower portion is disposed on the upper insulating plate 17 (FIG. 3(d)). Since the first positive electrode lead 14a and the second positive electrode lead 14b are bent in an outer circumference side direction of the electrode body 16, a space in which the current collector plate 18 is disposed can be secured. Subsequently, the first positive electrode lead 14a and the second positive electrode lead 14b are bent onto the current collector plate 18 so as to be connected thereto (FIG. 3(e)). As the connection method, laser welding may be used. Finally, in order to insert the electrode body 16 in the outer can 24, the current collector lead portion 18a of the current collector plate 18 is bent at an angle of 90° (FIG. 3(f)).

As apparent from the above description, according to the present invention, no through-holes through which the positive electrode leads are to be inserted are required to be provided in the current collector plate, and hence, an increase in electric resistance of the current collector plate can be prevented. In addition, as long as the positive electrode leads are each not overlapped with the current collector lead portion, the positive electrode leads can be connected to the current collector plate. Hence, the acceptable range of positional variation of the positive electrode leads on the current collector plate can be increased.

Figure 4:
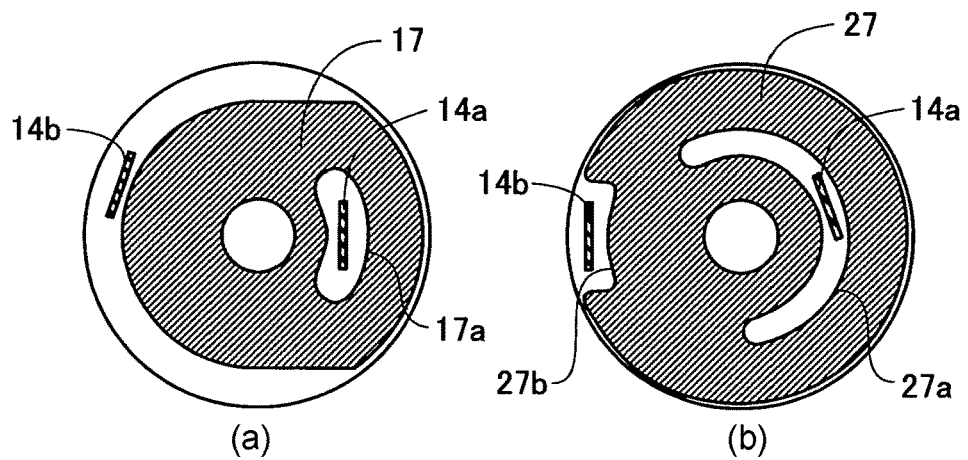
FIG. 4(a) is a plan view showing an upper insulating plate according to the embodiment disposed on the electrode body.
FIG. 4(b) is a plan view showing an upper insulating plate according to a modified example of the embodiment disposed on the electrode body.

In this embodiment, although the upper insulating plate 17 having a planar shape shown in FIG. 4(a) is used, there may also be used an upper insulating plate 27 in which as shown in FIG. 4(b), at least a part of an outer circumference portion thereof is provided with a notch portion 27b through which the second positive electrode lead 14b is allowed to pass. When this notch portion 27b is used as a reference for positioning of the upper insulating plate 27, a through-hole 27a is not required to be used as a reference for positioning, and hence, the area of the through-hole 27a can be increased. Accordingly, since the degree of freedom of the planar shape of the upper insulating plate is increased, the number of the positive electrode leads can be easily increased. As a material of the upper insulating plate, as long as the battery characteristics are not adversely influenced, any material, such as a polyethylene, having electric insulating properties may be used without any particular restrictions.

In this embodiment, at the lower portion of the current collector plate 18, the insulating member 19 is provided. Along an edge portion of this insulating member 19, convex portions are formed, and the displacement of the current collector plate 18 on the insulating member 19 can be prevented. Furthermore, at least one region located between the convex portions is formed to conform to the shape of the current collector plate, the current collector plate 18 and the insulating member 19 may also be formed as an integrated member. In this embodiment, the edge portion of the insulating member 19 includes not only the edge portion at an outer circumference side of the insulating member 19 but also includes the edge portion of an opening of the insulating member 19. The convex portions are not required to be formed all along the edge portion of the insulating member 19 and may be formed so as to prevent the movement of the current collector plate 18 on the insulating member 19. In the present invention, although the insulating member is not an essential member, since the influence on the electrode body by sputtering and the like generated when the positive electrode lead and a current collector plate are connected to each other can be more effectively prevented, the insulating member is preferably used. As a material of the insulating member, as long as the battery characteristics are not adversely influenced, any material, such as a polyethylene, having electric insulating properties may be used without any particular restrictions.

In this embodiment, the ring-shaped insulating plate 20 is disposed on the current collector plate 18. In the present invention, although the ring-shaped insulating plate is not always required to be disposed on the current collector plate, since the contact between the outer can and the positive electrode lead can be prevented, the ring-shaped insulating plate is preferably disposed on the current collector plate. The cross-sectional shape of the ring-shaped insulating plate may be an L-letter shape in which an outer circumference side protrudes to an electrode body side. As the outer circumference portion and the inner circumference portion of the planar shape of the ring-shaped insulating plate, a circular shape and a circle inscribed polygonal shape may be used; however, at least the outer circumference portion preferably has a circular shape.

In this embodiment, the current collector plate 18 has the current collector lead portion 18a which is integrally formed as a part of the current collector plate 18. According to the present invention, the current collector plate may also be formed by connecting a lead which is a separate component to a metal plate. By the formation method as described above, for example, the thickness of a metal plate portion of the current collector may be set larger than that of the current collector lead portion, and hence, the degree of freedom of designing the current collector plate can be increased. A material of the current collector plate is preferably the same as that of the positive electrode lead, and as an example of the material of the positive electrode lead and the current collector plate, aluminum and an aluminum alloy may be mentioned. For the connection between the current collector lead portion of the current collector plate and the sealing body, the same condition as that for a related cylindrical battery having a positive electrode plate to which one positive electrode lead is connected may be used. Hence, according to this embodiment, although having a positive electrode plate to which a plurality of positive electrode leads is connected, a cylindrical battery excellent in productivity can be provided.

Next, formation methods of the negative electrode plate 11, the positive electrode plate 13, the separator 15, and the non-aqueous electrolyte, each of which can be used in the cylindrical non-aqueous electrolyte secondary battery 10 according to this embodiment, and constituent materials thereof will be described.

The negative electrode plate 11 includes a negative electrode current collector and negative electrode mixture layers 11a formed on two surfaces of the negative electrode current collector. In this embodiment, although the negative electrode leads 12 are separately connected to negative electrode current collector exposed portions 11b provided at two end portions of the negative electrode plate 11, the negative electrode leads 12 may be connected only to one of the two end portions described above. As the negative electrode current collector, copper foil is preferably used. The negative electrode mixture layer 11a may be formed in such a way that a negative electrode mixture slurry containing a negative electrode active material is applied on the negative electrode current collector and then dried. To the negative electrode mixture slurry, besides the negative electrode active material, for example, a binder and an conductive agent may also be added. The negative electrode mixture layers 11a thus formed are compressed using a roller machine and are then cut into predetermined dimensions, so that the negative electrode plate 11 is obtained.

As the negative electrode active material, a carbon material and a metal oxide, each of which is able to occlude and release lithium ions, and a metal material which is able to form an alloy with lithium may be used. As the carbon material, for example, graphite, such as natural graphite and artificial graphite, may be mentioned. As the metal oxide and the metal material, silicon, tin, and oxides thereof may be mentioned. The carbon material, the metal oxide, and the metal material may be used alone, or at least two types thereof may be used by mixing, and graphite and silicon oxide may be used by mixing.

The positive electrode plate 13 includes a positive electrode current collector and positive electrode mixture layers 13a formed on two surfaces of the positive electrode current collector. In this embodiment, although the first positive electrode lead 14a and the second positive electrode lead 14b are separately connected to two positive electrode current collector exposed portions 13b provided in the positive electrode plate 13, the number of the positive electrode leads is not particularly limited to that of this embodiment, and at least three positive electrode leads may also be used. In the present invention, when at least three positive electrode leads are used, a positive electrode lead disposed at an inner circumference side of the upper insulating plate and a positive electrode lead disposed at an outer circumference side of the upper insulating plate are classified into the first positive electrode lead and the second positive electrode lead, respectively.

As the positive electrode current collector, aluminum foil is preferably used. The positive electrode mixture layer 13a may be formed in such a way that a positive electrode mixture slurry containing a positive electrode active material is applied on the positive electrode current collector and then dried. To the positive electrode mixture slurry, besides the positive electrode active material, for example, a binder and a conductive agent may also be added. The positive electrode mixture layers 13a thus formed are compressed using a roller machine and are then cut into predetermined dimensions, so that the positive electrode plate 13 is obtained.

As the positive electrode active material, a lithium transition metal composite oxide capable of occluding and releasing lithium ions may be used. As the lithium transition metal composite oxide, general formulas of $LiMO_2$ (M represents at least one of Co, Ni, and Mn), $LiMn_2O_4$, and $LiFePO_4$ may be mentioned. Those oxides may be used alone, or at least two types thereof may be used by mixing. At least one selected from the group consisting of Al, Ti, Mg, and Zr may be added to the above oxides to substitute the transition metal element thereof.

As the separator, a fine porous film containing as a primary component, a polyolefin, such as a polyethylene (PE) or a polypropylene (PP), may be used. The fine porous sheet may be used as a single layer or a multilayer formed by laminating at least two layers. In a multilayer separator having at least two layers, a layer containing as a primary component, a polyethylene (PE) having a low melting point is preferably used as an intermediate layer, and a polypropylene (PP) excellent in oxidation resistance is preferably used as a surface layer. Furthermore, to the separator, inorganic particles of aluminum oxide ($Al_2O_3$), titanium oxide ($TiO_2$), and silicon oxide ($SiO_2$) may be added. Those inorganic particles may be supported in the separator and may also be applied to the surface of the separator together with a binder.

As the non-aqueous electrolyte, there may be used a liquid in which a lithium salt functioning as an electrolyte salt is dissolved in a non-aqueous solvent functioning as a solvent. In addition, a non-aqueous electrolyte using a gelled polymer instead of the non-aqueous solvent may also be used.

As the non-aqueous solvent, a cyclic carbonate ester, a chain carbonate ester, a cyclic carboxylic acid ester, and a chain carboxylic acid ester may be used, and at least two types of those esters are preferably used by mixing. As the cyclic carbonate ester, for example, ethylene carbonate (EC), propylene carbonate (PC), butylene carbonate (BC) may be mentioned. In addition, as is the case of fluoroethylene carbonate (FEC), a cyclic carbonate ester in which at least one hydrogen atom is substituted by at least one fluorine atom may also be used. As the chain carbonate ester, for example, dimethyl carbonate (DMC), ethyl methyl carbonate (EMC), diethyl carbonate (DEC), and methyl propyl carbonate (MPC) may be mentioned. As the cyclic carboxylic acid ester, for example, γ-butyrolactone (γ-BL) and γ-valerolactone (γ-VL) may be mentioned, and as the chain carboxylic acid ester, for example, methyl pivalate, ethyl pivalate, methyl isobutyrate, and methyl propionate may be mentioned.

As the lithium salt, for example, there may be mentioned $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Among those mentioned above, $LiPF_6$ is particularly preferable, and the concentration thereof in the non-aqueous electrolyte is preferably 0.5 to 2.0 mol/L. Another lithium salt, such as $LiBF_4$, may also be mixed with $LiPF_6$.

INDUSTRIAL APPLICABILITY

According to the present invention, although having a positive electrode plate to which a plurality of positive electrode leads is connected, a cylindrical battery excellent in productivity can be provided. The cylindrical battery having a positive electrode plate to which a plurality of positive electrode leads is connected is excellent in electrochemical characteristics such as load characteristics. In addition, according to the present invention, since no through-holes in which the positive electrode leads are to be inserted are required to be formed in the current collector plate, a current collector plate having a low electric resistance can be provided. That is, since being able to contribute to the improvement in productivity of a cylindrical battery to be used as a drive power source for applications, such as an electric power tool, an electric assist bicycle, and a hybrid electric automobile, in which a high output is required, the present invention may be used for industrial purposes with a high probability.

REFERENCE SIGNS LIST 10 cylindrical non-aqueous electrolyte secondary battery
11 negative electrode plate
12 negative electrode lead
13 positive electrode plate
14 positive electrode lead
14a first positive electrode lead
14b second positive electrode lead
15 separator
16 electrode body
17 upper insulating plate
17a through-hole
18 current collector plate
19 insulating member
20 ring-shaped insulating plate
21 lower insulating plate
22 gasket
23 sealing body
24 outer can

The invention claimed is:

1. A cylindrical battery comprising: an electrode body in which a negative electrode plate and a positive electrode plate to which a plurality of positive electrode leads is connected are wound with a separator interposed therebetween; an upper insulating plate disposed on the electrode body; a sealing body; a current collector plate disposed between the upper insulating plate and the sealing body; and an outer can,
   wherein the upper insulating plate has at least one through-hole,
   the plurality of positive electrode leads includes at least one first positive electrode lead disposed at an inner circumference side of the upper insulating plate and at least one second positive electrode lead disposed at an outer circumference side of the upper insulating plate,
   the first positive electrode lead extends between the upper insulating plate and the current collector plate after passing through the through-hole of the upper insulating plate and is bent onto the current collector plate at an outer circumference portion thereof,
   the second positive electrode lead extends along the outside of the outer circumference portion of the upper insulating plate and is bent onto the current collector plate at the outer circumference portion thereof,
   the first positive electrode lead and the second positive electrode lead are connected to the current collector plate, and
   the current collector plate is electrically connected to the sealing body.

2. The cylindrical battery according to claim 1, wherein the outer circumference portion of the upper insulating plate is provided with a notch portion.

3. The cylindrical battery according to claim 1, further comprising an insulating member having a convex portion along at least a part of an edge portion thereof at a lower portion of the current collector plate.

4. The cylindrical battery according to claim 1, wherein the plurality of positive electrode leads is laser-welded onto an upper surface of the current collector plate.

5. The cylindrical battery according to claim 1, wherein the plurality of positive electrode leads is formed from aluminum or an aluminum alloy.

6. The cylindrical battery according to claim 1, wherein the number of the first positive electrode lead and the number of the second positive electrode lead are each one.

* * * * *